UNITED STATES PATENT OFFICE 2,572,574

3-(THIOCYANOMETHYL) THIANAPHTHENE AND HERBICIDAL COMPOSITIONS COMPRISING SAME

Arthur H. Schlesinger and David T. Mowry, Dayton, Ohio, assignors to Monsanto Chemical Company, St. Louis, Mo., a corporation of Delaware No Drawing. Application July 25, 1950,
Serial No. 175,858

6 Claims. (Cl. 71—2.5)

This invention relates to organic thiocyanates and deals more particularly with 3-(thiocyanomethyl) thianaphthene, to a method of preparing it, and to herbicidal compositions comprising the same.

The 3-(thiocyanomethyl) thianaphthene is readily obtainable by contacting a suitable halomethyl thianaphthene with an inorganic thiocyanate substantially according to the scheme

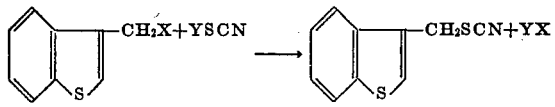

in which X is a member of the class consisting of chlorine and bromine and Y is a member of the class consisting of ammonium and alkali and alkaline earth metals. Halomethyl thianaphthenes suitable for the present purpose include 3-(chloromethyl) thianaphthene and 3-(bromoethyl) thianaphthene. Inorganic thiocyanates which may be employed include potassium, sodium, lithium, barium, calcium, strontium, magnesium and ammonium thiocyanates.

The reaction occurs by contacting the halomethyl thianaphthene with the inorganic thiocyanate at ordinary or increased temperatures; however, for optimum yields of 3-(thiocyanomethyl) thianaphthene, it is preferred to heat a mixture of the halomethyl thianaphthene and the inorganic thiocyanate, advantageously in the presence of an inert solvent or diluent, at a temperature of from, say, 60° C. to the refluxing temperature of the reaction mixture for a time of, say, for a few minutes to several hours. As inert diluents there may be employed aliphatic, oxygen-containing compounds such as methanol, ethanol, isopropanol, isobutanol, acetone, ethyl acetate and isopropyl ether; nitro compounds such as the nitroparaffins and nitrobenzene, etc. In order to facilitate removal of the inorganic halide which is formed as a by-product, it is preferred to employ as a diluent a liquid in which the halide is substantially insoluble; hence, an alcoholic or ketonic diluent is generally preferred.

Inasmuch as the condensation involves one mole of the halomethyl thianaphthene with one mole of the inorganic thiocyanate, stoichiometric proportions of the reactants are advantageously employed. However, since any excess of either the halide or the thiocyanate may be readily recovered from the final product, the quantity of reactants initially employed is immaterial. It is preferred, however, to use an excess of the more readily available inorganic thiocyanate in order to assure complete reaction of the halomethyl thianaphthene under the reaction conditions employed.

3-(thiocyanomethyl) thianaphthene is a stable, rather high boiling material having a pleasant aromatic odor. It is particularly valuable as a herbicide, but it also may be advantageously employed as an insecticide and pesticide in general, as a rubber compounding chemical, etc. It is also valuable as an intermediate in the production of other industrially important materials.

3-(thiocyanomethyl) thianaphthene is an effective herbicide over wide ranges of concentration. Its effect may be measured by determining the inhibition of root growth of germinating seedlings as compared to similar, untreated plants. The general technique of evaluation of herbicides in Petri dishes has been described by Thompson, Swanson and Norman, Botannical Gazette, 107, 476 to 507 (1946). Results obtained by employing such technique, as will be hereinafter disclosed, show the value of the present compounds.

The invention is further illustrated, but not limited, by the following examples:

Example 1

A mixture consisting of 35 g. (0.192 mole) of 3-(chloromethyl) thianaphthene, 19.4 g. (0.200 mole) of potassium thiocyanate and 600 ml. of alcohol was refluxed for 30 minutes. The resulting hot solution was then filtered to give 14.3 g. of potassium chloride, the alcohol was removed in vacuo, water was added, and the oil which formed was decanted. The water layer was then washed with chloroform and the combined oil and chloroform washings were distilled to give an 89 per cent yield of the substantially pure 3-(thiocyanomethyl) naphthalene, B. P. 172° C. to 176° C./2 to 2.5 mm. $n_D^{25}$ 1.6790, and analyzing as follows:

|  | Calcd. for $C_{10}H_7NS_2$ | Found |
|---|---|---|
| Per Cent C | 58.50 | 58.99 |
| Per Cent H | 3.42 | 3.40 |

Example 2

Herbicidal activity of a number of thiocyanates and thianaphthenes, including the 3-(thiocyanomethyl) thianaphthene of the preceding example, was determined by germination of cucumber seeds for 4 days at a temperature of 76° F. in the presence of aqueous solutions or suspensions of each of the indicated chemicals at concentrations of 100 p. p. m. Seventy-five seeds were used for each test. The results are expressed as per cent length of the primary roots in the presence of the chemical compared with the length of the primary roots which had been germinated in water.

| Compound Tested | Per Cent Growth at 100 Parts per Million |
| --- | --- |
| 3-(Thiocyanomethyl) thianaphthene | 22 |
| 2,4-Dichlorobenzyl thiocyanate | 55 |
| α-(Thiocyanomethyl) naphthalene | 46 |
| Butyl thiocyanate | 94 |
| 3-Chlorothianaphthene | 53 |
| 3-Thianaphthenecarboxylic acid-1-dioxide | 104 |
| 4-Isopropyl-1,3-xylylene dithiocyanate | 94 |

The herbicidal efficiency of the 3-(thiocyanomethyl) thianaphthene is remarkable because, as shown above, neither thiocyano compounds, generally, nor thianaphthene compounds, generally, possess great herbicidal efficiency.

3-(thiocyanomethyl) thianaphthene is particularly valuable from an economic standpoint, because not only does it possess a high degree of herbicidal activity, but it is more readily available than many standard herbicides. Thus (chloromethyl)- or (bromomethyl) thianaphthene which are used as intermediates in the preparation of the present compound are materials which are obtainable in good yields by reaction of ethylbenzene or styrene to yield thianaphthene and subsequent halomethylation of the thianaphthene.

The 3-(thiocyanomethyl) thianaphthene is preferably applied to plants by spraying aqueous dispersions of the same, this method affording an easy and inexpensive way of destroying plant growth. However, it is likewise effective when applied in dusts, for example, in admixture with such carriers as clay, lime, talc, bentonite, pumice, fuller's earth, etc. 3-(thiocyanomethyl)-thianaphthene is soluble in the usual organic solvents and may be used in solution, e. g., in kerosene or benzene solution as a herbicidal spray.

The dispersions or solutions may be used to destroy already existing plant growth by direct application to the undesirable plants, or they may be employed to prevent the plant growth by application to soils. When employed to prevent plant growth, for example in parking areas, highway abutments, railway yards, etc., they may be applied either as an aqueous spray or dust or they may be admixed with customarily employed temporary surfacing materials, e. g., oils, cinders, etc. The present invention thus provides a generally useful method of preventing and destroying undesirable plant growth.

Only small amounts of the present compound need be employed. For general utility, concentrations of from, say, 0.1 part to 10 parts of 3-(thiocyanomethyl) thianaphthene per hundred parts by weight of the carrier may be employed, and in this manner an acre of land may be freed of plants by application of only a few pounds of the present herbicide.

What we claim is:

1. 3(thiocyanomethyl) thianaphthene.

2. The process which comprises contacting an halomethyl thianaphthene selected from the class consisting of 3-(chloromethyl) thianaphthene and 3-(bromomethyl) thianaphthene with a thiocyanate which is a member of the class consisting of ammonium, alkali metal and alkaline earth metal thiocyanates and recovering 3-(thiocyanomethyl) thianaphthene from the resulting product.

3. The process which comprises refluxing 3-(chloromethyl) thianaphthene with potassium thiocyanate in the presence of an inert diluent and recovering 3-(thiocyanomethyl) thianaphthene from the resulting reaction product.

4. A herbicidal composition including 3-(thiocyanomethyl) thianaphthene as an active ingredient.

5. A herbicidal composition including a carrier and containing 3-(thiocyanomethyl) thianaphthene as an active ingredient.

6. A herbicidal composition comprising an aqueous dispersion of 3-(thiocyanomethyl) thianaphthene.

ARTHUR H. SCHLESINGER.
DAVID T. MOWRY.

No references cited.